United States Patent
Sudarshan et al.

(10) Patent No.: US 8,422,411 B2
(45) Date of Patent: Apr. 16, 2013

(54) FLEXIBLE FRAME STRUCTURE IN WIRELESS COMMUNICATION SYSTEM

(75) Inventors: Pallav Sudarshan, Waukegan, IL (US); Kenneth A. Stewart, Grayslake, IL (US); Xiangyang Zhuang, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 136 days.

(21) Appl. No.: 11/868,526

(22) Filed: Oct. 7, 2007

(65) Prior Publication Data

US 2009/0092067 A1   Apr. 9, 2009

(51) Int. Cl.
- H04J 1/00 (2006.01)
- H04J 3/00 (2006.01)
- H04W 4/00 (2009.01)

(52) U.S. Cl.
USPC .................. 370/281; 370/329; 370/336

(58) Field of Classification Search .................. 370/389, 370/280, 370, 230, 322, 328, 329, 281, 336; 455/91
See application file for complete search history.

(56) References Cited

U.S. PATENT DOCUMENTS

| | | | |
|---|---|---|---|
| 5,025,254 A | 6/1991 | Hess | |
| 6,031,827 A | 2/2000 | Rikkinen et al. | |
| 6,631,116 B1 | 10/2003 | Eneroth et al. | |
| 6,996,060 B1 * | 2/2006 | Dahlby et al. | 370/230 |
| 7,002,929 B2 * | 2/2006 | Struhsaker et al. | 370/280 |
| 7,352,714 B2 * | 4/2008 | Balachandran et al. | 370/322 |
| 2002/0006165 A1 | 1/2002 | Kato | |
| 2002/0015529 A1 | 2/2002 | Kato | |
| 2002/0064140 A1 | 5/2002 | Numminen | |
| 2002/0102948 A1 * | 8/2002 | Stanwood et al. | 455/91 |
| 2004/0057407 A1 | 3/2004 | Balachandran et al. | |
| 2006/0245380 A1 | 11/2006 | Lenzini et al. | |
| 2007/0140167 A1 * | 6/2007 | Jang et al. | 370/329 |
| 2007/0177537 A1 * | 8/2007 | Wandel et al. | 370/328 |
| 2007/0268848 A1 | 11/2007 | Khandekar et al. | |
| 2008/0101355 A1 * | 5/2008 | Ojala et al. | 370/389 |
| 2008/0144612 A1 * | 6/2008 | Honkasalo et al. | 370/370 |
| 2009/0219841 A1 | 9/2009 | Sudarshan et al. | |

FOREIGN PATENT DOCUMENTS

| | | |
|---|---|---|
| EP | 0713347 A2 | 5/1996 |
| EP | 1718096 B1 | 11/2009 |
| WO | 2004004244 A1 | 1/2004 |

OTHER PUBLICATIONS

IEEE 802.16 "Part 16: Air Interface for Broadband Wireless Access Systems", Section 8.4.4 P802.16Rev2/D5 (Jun. 2008) pp. 704-726.
Patent Cooperation Treaty, "PCT Search Report and Written Opinion of the International Searching Authority" for International Application No. PCT/US2009/034814 Jan. 4, 2010, 12 pages.
United States Patent and Trademark Office, "Non-Final Rejection" for U.S. Appl. No. 12/388,727 Oct. 19, 2010, 25 pages.

* cited by examiner

*Primary Examiner* — Mark Rinehart
*Assistant Examiner* — Gbemileke Onamuti (57) ABSTRACT

A wireless communication system frame structure configurable to serve to half-duplex user terminals or a mixture of half-duplex and full-duplex user terminals based on a grouping of the user terminals according to one or more criteria. In one embodiment, user terminals are switched from one group to another. A user terminal signaling mechanism is also provided.

4 Claims, 9 Drawing Sheets

FIG. 9

FLEXIBLE FRAME STRUCTURE IN WIRELESS COMMUNICATION SYSTEM

FIELD OF THE DISCLOSURE

The present disclosure relates generally to wireless communications and more particularly to frame structures that can be flexibly configured to serve to half-duplex users or a mixture of half- and full-duplex users.

BACKGROUND

In some wireless communication protocols, for example, in Half Duplex Frequency Division Duplex (HD-FDD), the communication devices cannot transmit and receive at the same time. In such systems, the base station (BS) must ensure that the uplink (DL) and downlink (UL) traffic for these devices are not scheduled simultaneously. In addition, adequate time should be reserved to allow the HD communication devices to switch between transmission and reception modes. For HD-FDD systems, for example, a group-based frame structure is a well-known structure that simplifies traffic scheduling. In group-based frame structures, users are divided into multiple groups such that the DL traffic for one group does not overlap with the UL traffic for the same group. Based on this general concept, it is desirable to provide an efficient frame structure to enable various grouping strategies.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
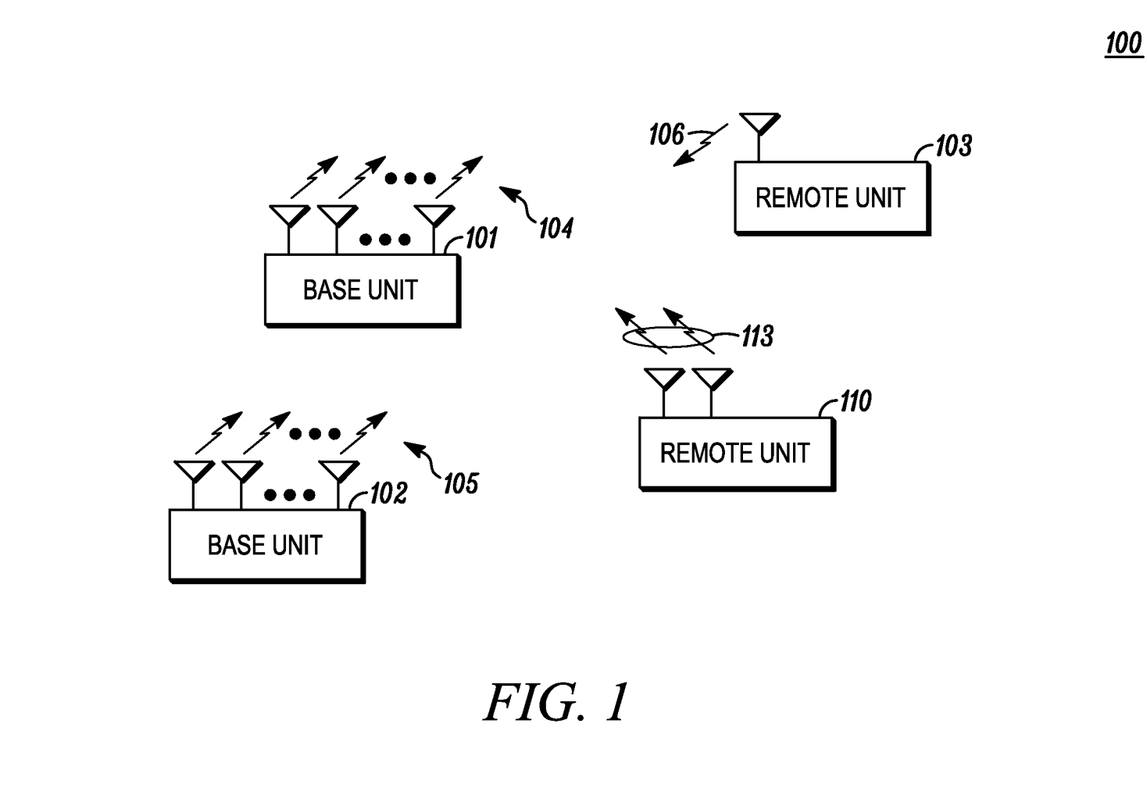
FIG. 1 illustrates a wireless communication system.

In FIG. 1, the wireless communication system 100 includes one or more fixed base infrastructure units forming a network distributed over a geographical region. A base unit may also be referred to as an access point, access terminal, base station, Node-B, eNode-B, or by other terminology used in the art. The one or more base units 101 and 102 serve a number of remote units 103 and 110 within a serving area, for example, a cell, or within a cell sector. In some systems, one or more base units are communicably coupled to a controller forming an access network that is communicably coupled to one or more core networks. The disclosure however is intended not to be limited to any particular wireless communication system architecture.

Generally, the serving base units 101 and 102 transmit downlink communication signals 104 and 105 to remote units in the time and/or frequency domain. Remote units 103 and 110 communicate with one or more base units 101 and 102 via uplink communication signals 106 and 113. The one or more base units may comprise one or more transmitters and one or more receivers that serve the remote units. The remote units may be fixed or mobile user terminals. The remote units may also be referred to as subscriber units, mobile stations, users, terminals, subscriber stations, user equipment (UE), user terminals, or by other terminology used in the art. The remote units may also comprise one or more transmitters and one or more receivers. The remote units may have half duplex (HD) or full duplex (FD) transceivers. Half-duplex transceivers do not transmit and receive simultaneously whereas full duplex terminals do.

In one embodiment, the communication system utilizes OFDMA or a next generation single-carrier (SC) based FDMA architecture for uplink transmissions, such as interleaved FDMA (IFDMA), Localized FDMA (LFDMA), DFT-spread OFDM (DFT-SOFDM) with IFDMA or LFDMA. In OFDM based systems, remotes units are served by assigning downlink or uplink radio resources that typically consists of a set of subcarriers over one or more OFDM symbols. Exemplary OFDM based protocols include the developing 3GPP LTE standard and IEEE 802.16 standard.

In some implementations, the serving base station serves user terminals in one or more groups based on one or more grouping criterion. Generally, at least two user terminals are assigned to at least one group. In one implementation, for example, the base station groups multiple user terminals in first and second groups. Some user terminals, for example, HD user terminals are generally served in not more than one group, while FD user terminals may be served in multiple groups simultaneously. Grouping can be dynamically adjusted based on one or more grouping criterion selected from the following set: the signal to interference plus noise ratio (SINR) of the user terminal; whether or not the user terminal is currently receiving multicast/broadcast services; the quality of service (QoS) requirements of the user terminal; the geographical location of the user terminal; half- or full-duplex capability of the user terminal; whether the user terminal is in active state, sleep state, or inactive state; and group load balancing considerations.

Figure 2:
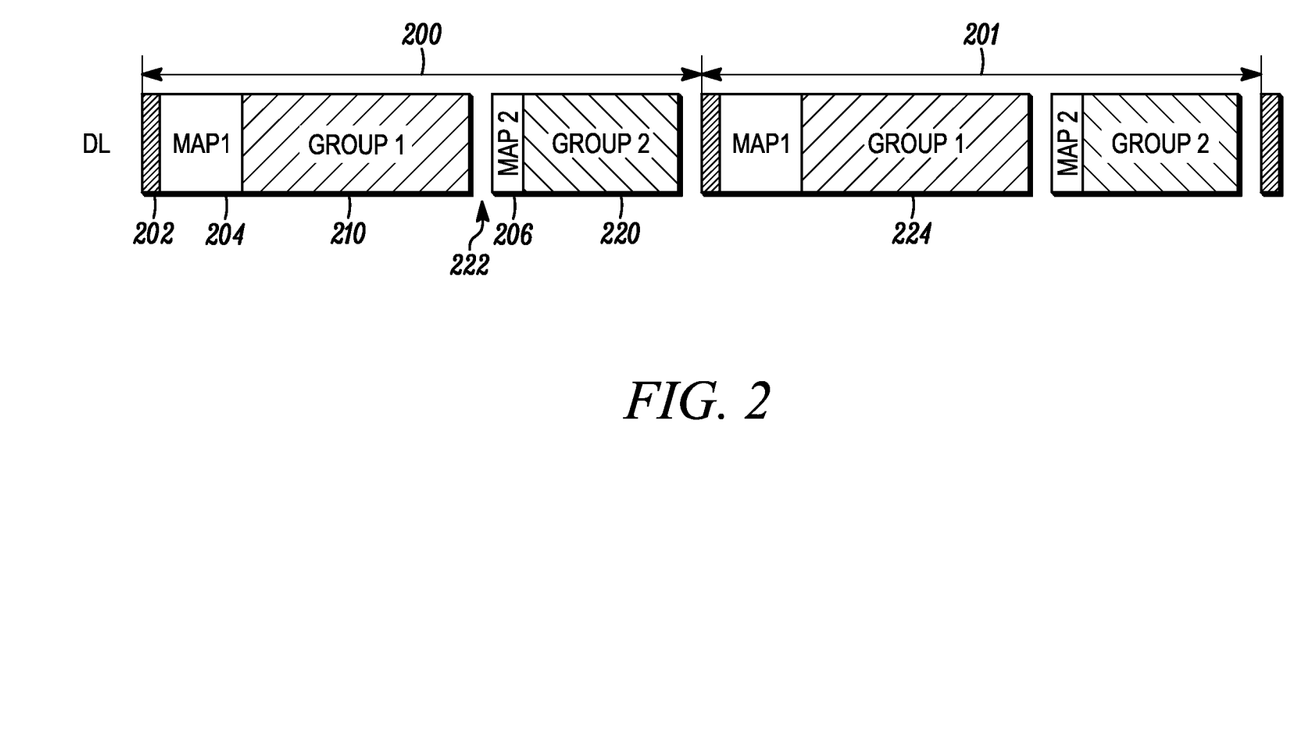
FIG. 2 is a series of downlink radio frames that are divided into two temporal non-overlapping regions, separated by a temporal gap, to serve two groups users.

Generally, the user terminals are served in a series of downlink radio frames. In one implementation, a downlink radio frame is divided into one or more regions, wherein each region serves a corresponding group of user terminals. FIG. 2 illustrates a series of downlink radio frames 200, 201 . . . wherein each frame has a temporal duration, for example, 5 ms. In other embodiments, the duration may be other values. In FIG. 2, each frame includes a first temporal region 210 and a second temporal region 220 wherein user terminals in a first group are served in the first temporal region and user terminals in a second group served in the second temporal region. FIG. 2 also illustrates a temporal gap 222 after the first region 210 in each downlink radio frame. Similarly, in FIG. 2 there is a gap after the second region 220 before the next frame 201. In some other implementations, there may not be a gap after each region. In some embodiments, such as in the IEEE802.16 standard, each downlink frame includes a preamble 202, as shown in FIG. 2.

Each frame generally includes a message that conveys control information to user terminals. The message includes information of the downlink or uplink resource assignment to specific user terminals, paging, instruction to user terminals for proper system operation, information regarding the frame structure, and more. In the example of IEEE 802.16 standard, such control message is referred to as MAP message. In some embodiments, a single MAP message is transmitted to user terminals in all groups regarding resource assignment for both the first and second regions. However, no HD user terminals that need to receive the MAP will be able to transmit during MAP message in this arrangement, which cause result in some unusable uplink air time. In another embodiment, a separate MAP is provided in each of the first and second regions to allocate user terminals of each group resources within their respective regions. In FIG. 2, for example, a MAP1 204 is associated with the first temporal region and MAP2 206 is associated with the second temporal region. In one implementation, the MAP1 is considered to be a part of the first region and the MAP2 is considered to be a part of the second region.

As mentioned above, one grouping criterion is to group user terminals according to their SINRs during reception. In general, the SINR condition is closely related to the geographical location of the user terminal, but due to random shadowing and fading in propagation, a user terminal that is closer to a base station does not necessarily always correspond to higher SINR. In one implementation, user terminals with a good downlink SINR condition are served in the second group while user terminals with a poor SNR condition are served in the first group. With this particular grouping, a MAP2 206 for Group-2 220 may be broadcasted with spectrally more efficient modulation and coding scheme, compared with Group-1 MAP1 204 messages. This grouping criterion can reduce the total overhead required for serving both groups. In this particular implementation, user terminals with poor SINR will not be able to successfully decode MAP2 and they will automatically be served in Group-1 region 210. User terminals with an SINR that is good enough for decoding successfully MAP2 206 will also be able to decode MAP1 204 typically. In this case, the user terminals can join either group according to a certain rule defined by the base station, such as random selection or "always Group 2". Note that the base station can always control the loading of the each group with rejections to any entry request.

In another implementation, a base station may always be able to choose not to differentiate remote units according to their SINR conditions. In that case, a base station may serve a remote unit in either group and the MAP message associated with each group will be sent with the same spectral efficiency to ensure similar cell coverage. This implementation may allow minimal communications between the base station entities (software or hardware) that serve different groups.

In another implementation of the grouping concept, all remote units that are receiving Multicast and Broadcast Services (MBS) maybe served in one frame, so that the base station will not need to send the same MBS traffic in the other regions. Better spectral efficiency can be obtained with this grouping.

In another implementation, a base station may consider the asymmetric traffic pattern of a user to decide the group in which it belongs. For example, users with more downlink traffic can be assigned to the group that has a longer duration of the downlink region and a shorter duration of the uplink region. An opposite case will be more appropriate for uplink-heavy traffic pattern.

In another implementation of the grouping concept, FD user terminals may be grouped together to take advantage of the simultaneous transmission and reception capability.

Figure 3:
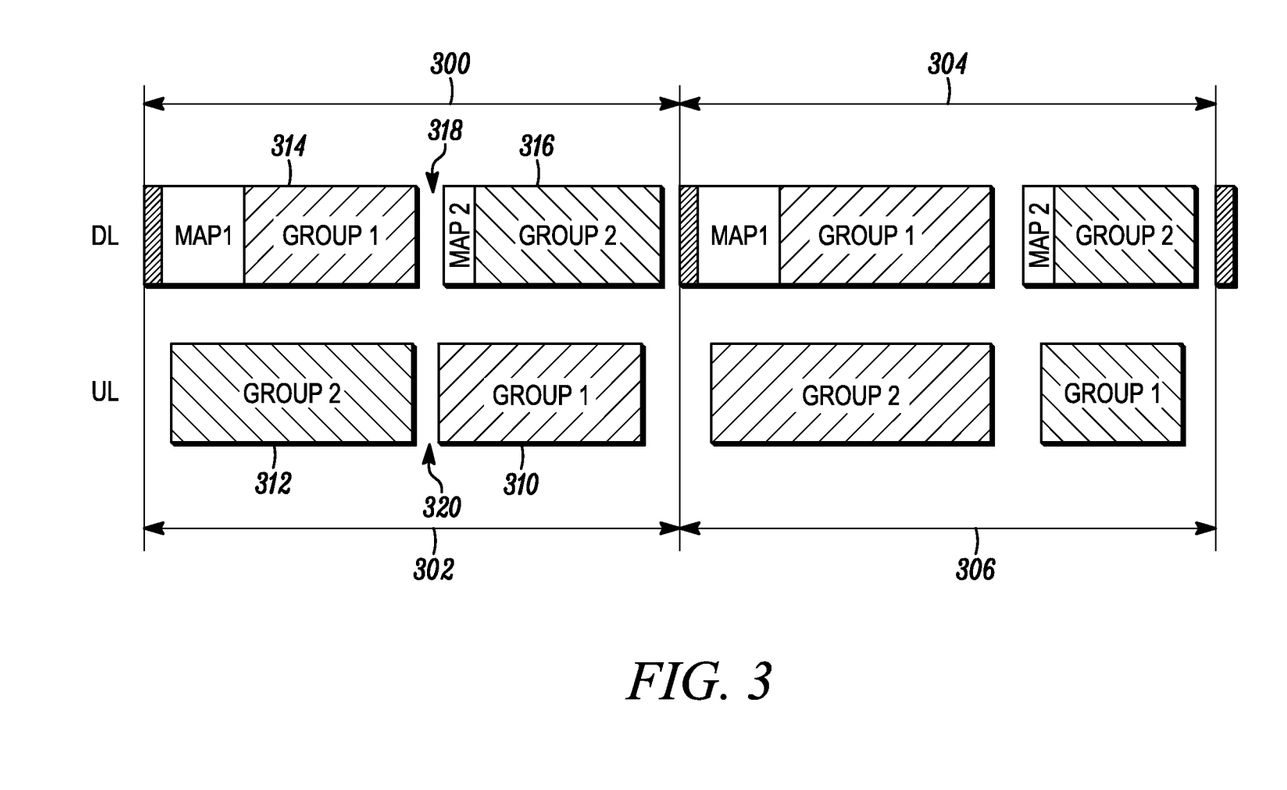
FIG. 3 is a series of downlink and corresponding uplink radio frames serving two groups of half-duplex users with two temporal non-overlapping regions in each frame. The durations of the first and second regions are dynamically reconfigured from one value to another value in a subsequent frame.

In some implementations, the user terminals are also served in a series of uplink radio frames. In systems with both uplink (UL) and downlink (DL) frames, there is generally a corresponding uplink radio frame for each downlink frame. An uplink and corresponding downlink frames may or may not temporally overlap. FIG. 3 illustrates a series of downlink radio frames and a corresponding series of uplink frames, wherein DL frame 300 corresponds to uplink frame 302 and DL frame 304 corresponds to UL frame 306. In FIG. 3 the uplink and corresponding downlink frames temporally overlap. In FIG. 3, the DL frames also include first and second temporal regions, for example, DL frame 300 includes the first temporal region 314 and the second temporal region 316. In one implementation, each uplink radio frames is also divided into one or more regions, wherein each region serves a corresponding group of user terminals. In FIG. 3, for example, UL frame 302 includes a first temporal region 310 and a second temporal region 312. The first temporal region of the UL frame serves user terminals in a first group and the second temporal region thereof serves users in a second group. As one implementation, FIG. 3 shows an uplink radio frame that also contains a gap between the first and second region in each frame and a temporal gap between the second region of a frame and the first region of the next uplink frame. In other implementations, not all the gaps will be present.

In embodiments where the DL and UL frames serve half-duplex users, the temporal region of the DL frame that serves user terminals in the first group does not overlap temporally with the temporal region of the corresponding UL frame that serves the user terminals in the first group. Similarly, the temporal region of the DL frame that serves user terminals in the second group does not overlap temporally with the temporal region of the corresponding UL frame that serves the user terminals in the second group. Thus in FIG. 3, the temporal region 314 in the DL frame that serves Group 1 users does not overlap with the temporal region 310 of the UL frame. Similarly, the temporal region 316 of the DL frame does not overlap temporally with the temporal region 312 of the UL frame as both regions serve users in Group 2.

In one implementation, half-duplex user terminals are assigned to use only one of the UL regions according to its groups. The uplink assignment instruction for each group is contained in the MAP message of the respective group in the case of a separate MAP. In another implementation, half-duplex user terminals may be instructed to use resources that belong to more than one group. In another implementation, full-duplex user terminals can be instructed to transmit using resources from more than one group.

In some implementations, a temporal gap is provided between two regions in either of a DL or corresponding UL frame. In FIG. 2 for example, there is a temporal gap 222 between region 210 and 220. In FIG. 3, there is a temporal gap 318 between regions 314 and 316 in the DL frame and a gap 320 between the regions 312 and 310 in the UL frame. Thus the gap may be located in either or both of the corresponding DL and UL frames. The gap in a DL radio frame 318 and the gap in the corresponding UL radio frame 320 are typically determined jointly.

The purpose of defining these two gaps is to make sure there is adequate switch time left to allow a half-duplex user to switch from the reception mode to the transmission mode, or vice versa, regardless of the propagation delay between the user terminal and the serving base station. In FDD where the DL and UL radio frames are on different frequencies, the switch time includes what user terminals need to retune the transceiver to receive on the DL or transmit on the UL during the temporal gap. In the example of IEEE 802.16, the time required for the user terminal to switch from receive mode to transmit mode is referred to as SSRTG, and the time required by the user terminal to switch from transmit mode to receive mode is referred to as SSTTG.

In FIG. 3, a user terminal in the first group, once done with reception at the end of the first region 314, will need enough time to switch to transmission so that its uplink signal arrives at the base station starts from the beginning of the uplink region 310 for the first group. Similarly, a user terminal in the first group, once done with transmission in the uplink region 310, will need enough time to switch to the reception of downlink signal that was sent starting from the beginning of the Group 1 region in the next downlink frame 304. In a typical deployment, the gaps should be minimized so that the air time utilization is maximized, given there is no transmission during the gaps. In another implementation, a temporal gap is not needed for FD user terminals. In one embodiment, the duration of the temporal gap is a multiple of the symbol duration.

FD users can be served in various ways along with HD users. FD user terminals, in contrast to HD user terminals, can transmit and receive simultaneously. In one implementation, a base station can serve an FD user in more than one group simultaneously, i.e., the user terminal is assigned downlink or uplink traffic in more than one region, and the user needs to learn its assignment from the MAP messages in these regions. In another implementation, a base station can define a set of radio frames dedicated to serve only FD user terminals, by configuring the downlink radio frame such that a downlink radio frame serves only the group of full-duplex users and such that the corresponding uplink radio frame serves only the group of full-duplex users.

Figure 4:
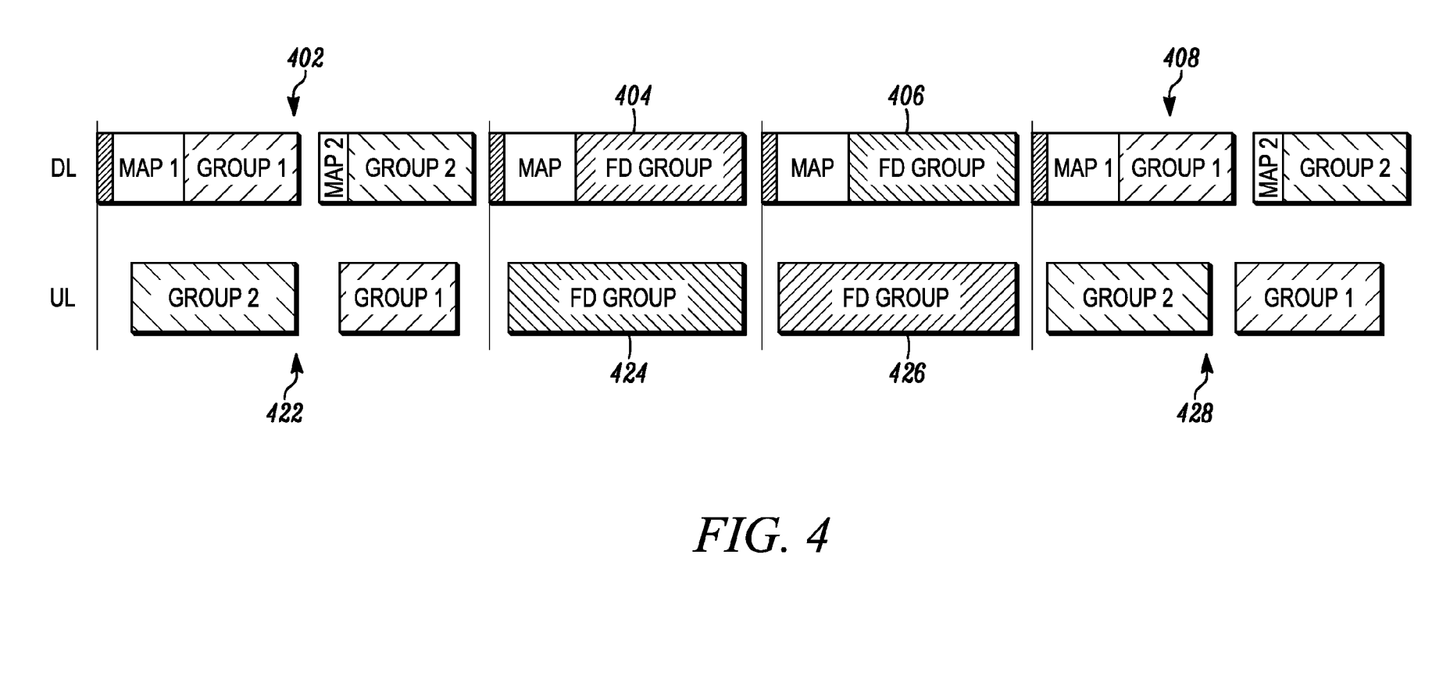
FIG. 4 illustrates a series of downlink and corresponding uplink radio frames serving a mixture of half- and full-duplex users. A radio frame can be reconfigured to serve only full-duplex users.

FIG. 4 illustrates a sequence of DL frames 402, 404, 406, 408 . . . and a corresponding sequence of UL frames 422, 424, 426, 428 . . . . The DL frame 402 and corresponding UL frame 422 both have first and second temporal regions serving HD user Groups 1 & 2 as indicated. The regions are temporally arranged such that the UL and DL regions serving Group 1 do not temporally overlap and the DL and UL regions serving group 2 do not overlap temporally. The durations of the regions in the DL frame 404 are changed such that DL frame 404 serves only a group of FD user terminals. In this case the second region is eliminated. Similarly, the durations of the regions in the corresponding UL frame 424 are changed such that UL frame 424 serves the same group of FD user terminals. The DL frame 406 and the corresponding UL frame 426 are similarly configured to serve a group of FD user terminals. The DL frame 408 and the corresponding UL frame 428 are reverted back to serve HD user terminals.

In another implementation, a base station can dedicate a special temporal region in a downlink radio frame and a special region in the corresponding uplink radio frame to serve FD users. In another implementation, a base station can dedicate a portion of the band in a downlink radio frame and a portion of the band in the corresponding uplink radio frame to serve a group of FD users.

In one embodiment, a temporal duration of either the first or second temporal regions of at least one radio frame in the series of radio frames is changed. Typically when the duration of one region is changed, the duration of other regions will be changed as well, especially if the temporal gaps are still the same. Generally the base station is capable of implementing these duration changes based upon one or more criterion, typically under the control of a programmable digital processor. In FIG. 2, for example, the duration of the first and second temporal regions of the DL frames 200 is different from the durations of the first and second temporal regions of frame 201. In FIG. 3, the durations of the temporal regions in both the DL and corresponding UL frames are changed. In implementations where HD user terminals are served, such changes are constrained by the requirement that the regions of the DL and UL frames serving user in the same groups do not overlap temporally, as discussed above. The changes to the durations of the temporal regions may be changed periodically or aperiodically. Thus the temporal duration of the regions may be changed on a frame by frame basis or every nth frame or pursuant to some irregular schedule.

In one embodiment, the duration of either of the temporal regions is changed based upon the assignment of user terminals to groups. For example, any change of the grouping criteria could trigger a change to the durations of regions corresponding to different groups. The set of grouping criteria includes the signal to interference plus noise ratio (SINR) of each user terminal; the amount of traffic for multicast/broadcast services; the quality of service (QoS) requirements of the user terminal; the geographical location of the user terminal; the mix of half- and full-duplex user terminals, loading in each group, and the traffic pattern in both downlink and uplink. As an example, a base station can increase the duration of a downlink region if it observes the group has more downlink traffic. Similar adjustments can be done when a group has more uplink traffic. Another example is that a base station can adjust the duration of the downlink region according to the amount of MBS traffic that resides in that region. In another embodiment, the duration of the temporal regions is changed based upon the number of terminals assigned to each group. For example, when a base station observes an increasing number good SINR users, it can increase the duration of the corresponding region.

In another embodiment, a base station can change the duration of the temporal regions to effectively serve a group of FD users in a set of radio frames, as discussed previously. In this case, a base station can use the mechanism defined for adjusting duration to specify a radio frame dedicated to serve only FD users.

In one embodiment, a configuration of the temporal gap in at least one frame of the series of frames is changed. The reconfiguration of a temporal gap is often closely related to changing the duration of either of the temporal regions. In FIG. 2, the configuration of the temporal gap is changed by changing the temporal duration of the gap. The duration of temporal gap 224 in frame 201 is greater than the gap in frame 200. As a result of the change of the temporal gap, the durations of at least one region will change as well. The configuration of the temporal gap may also be changed by changing the location of the gap. For example, the gap or a portion thereof may be moved from the DL frame to the UL frame or vice versa. The duration and location of the gap in downlink frame and the gap in uplink frame is typically considered jointly, which are also tied to the adjustment of durations of uplink regions for each group and the durations of downlink regions for each group.

By changing the durations and locations of the temporal gaps in downlink and uplink, the total number of symbols in the downlink radio frame (sum over all the temporal regions) and the total number of symbols in the uplink radio frame (sum over all the temporal regions) can be changed. In the example of IEEE 802.16, the symbol duration for 10 MHz bandwidth is 102.86 us and the frame duration is 5 ms. This numerology allows for a maximum of 48 symbols in a downlink radio frame, with a residual time of approximately 62 us (fraction of a OFDM symbol duration) that can be used. One configuration of the temporal gap can give a total of 48 symbols (including preamble) in the DL radio frame and, if assuming 100 us SSRTG and 100 us SSTTG, 43 symbols in the UL radio frame, while another configuration of the gap can give a total of 47 symbols ((including preamble) in the DL radio frame and 44 symbols in the UL radio frame. In this example, the usable DL symbols can be reduced by either one or two OFDM symbols while the usable UL symbols will be increased by the same number. The total number of symbols in the DL radio frame and UL radio frame can be fine tuned depending on the downlink and uplink traffic load.

Flexibility in the number of DL symbols and UL symbols provided by reconfiguration of the temporal gap can be useful in situations when there are constraints on the total number of useful UL symbols. For example, the total number of symbols in the UL radio frame may need to be a multiple of 3 in case of PUSC permutation in the current IEEE802.16 standard.

Also, the gap or a portion thereof may be moved within the same frame. For example, a portion of the gap may be moved to the end of the frame. The changes to the configuration of the temporal gap may be changed periodically or aperiodically. Thus the temporal duration of the gaps may be changed on a frame by frame basis or every nth frame or pursuant to some irregular schedule.

The base station generally indicates the locations and durations of the first and second temporal regions of each uplink and downlink radio frame. The information unambiguously specifies the downlink and corresponding uplink frame structure. Various different subsets of parameters can be used to signal the frame structure. The parameters include temporal gap in DL or UL, starting and ending position of a DL/UL region, duration of a DL/UL region. In the example of a downlink frame having only first and second temporal regions, only two parameters are needed: an offset value parameter (in OFDM symbols for example) specifying an end of the first temporal region from a reference point of the downlink frame, for example the beginning of the frame and this value is the duration of the first region then, and an offset value parameter specifying a start of the second temporal region. The duration of the second downlink region, in terms of the number of OFDM symbols, can be easily derived. In this particular example, the durations and locations of the two uplink regions are also known once the downlink regions are specified. This is based on the assumption that the DL/UL gaps for the first and second group are known to the system. The first temporal region in the uplink radio frame starts a fixed number of samples after the end of the first temporal region in downlink radio frame (RTG), and the second temporal region in the uplink radio frame ends a fixed number of samples before the start of the second temporal region in the downlink radio frame (TTG). For details on how to define the system RTG and TTG, refer to the discussion from paragraphs [00057] to [00065].

In one embodiment, an indication of the locations and durations of the first and second temporal regions of each uplink and downlink radio frame is located within both the first and the second temporal regions of at least one downlink radio frame. An updated indication would be necessary when there is a change to the location and/or duration of the regions. In a more particular implementation, the locations and durations of the first and second temporal regions of each uplink and downlink radio frame are indicated with an information element message containing parameters that define the locations and durations of the first and second temporal regions. The information element message is located in both the first and the second temporal regions of at least one downlink radio frame. In a more particular implementation for a downlink frame having first and second temporal regions, the information element message contains an offset value parameter specifying an end of the first temporal region from a reference point of the downlink frame and an offset value parameter specifying a start of the second temporal region. In this particular implementation, the durations and locations of the two uplink regions are also known once the downlink regions are specified. This is based on the assumption that the DL/UL gaps for the first and second group are known to the system.

As an example following the definition rule of an information element (IE) in IEEE 802.16, the information element may have the following fields:

Frame Configuration IE

| Field | Value | Size | Notes |
| --- | --- | --- | --- |
| DIUC | 15 | 4 bits | DIUC value |
| Extended DIUC | 0D | 4 bits | Extended DIUC value |
| Length | | 4 bits | Length of the message |
| Symbol offset 1 | Symbol offset 1 | 8 bits | Offset of the end of first downlink temporal region from the preamble |
| Symbol offset 2 | Symbol offset 2 | 8 bits | Offset of the start of second downlink temporal region from the preamble |

It is generally desirable that the user terminal has the most recent knowledge of the frame structure. In one implementation, a base station will send a frame configuration IE message to all groups in separate MAP messages whenever there is any change of the frame structure, at the same time the base station adds 1 (modulo) to a field named, for example, "configuration count" that is sent in all subsequent frames within the MAP messages. User terminals will be able to verify that its knowledge of the frame structure is valid and most recent by checking the stored "configuration count" value with the value in each frame. A base station may broadcast the frame configuration IE periodically just in case a user terminal may have missed a previous frame configuration IE that contains a change of the frame structure.

An example of dynamically changing the frame configuration by changing the temporal region boundaries is as follows: The first temporal region in a downlink radio frame has 24 symbols and the second temporal region in the downlink radio frame has 21 symbols; In the subsequent frame, the first temporal region and the second temporal region in a downlink radio frame has 24 symbols and the second temporal region in the downlink radio frame has 21 symbols.

Figure 5:
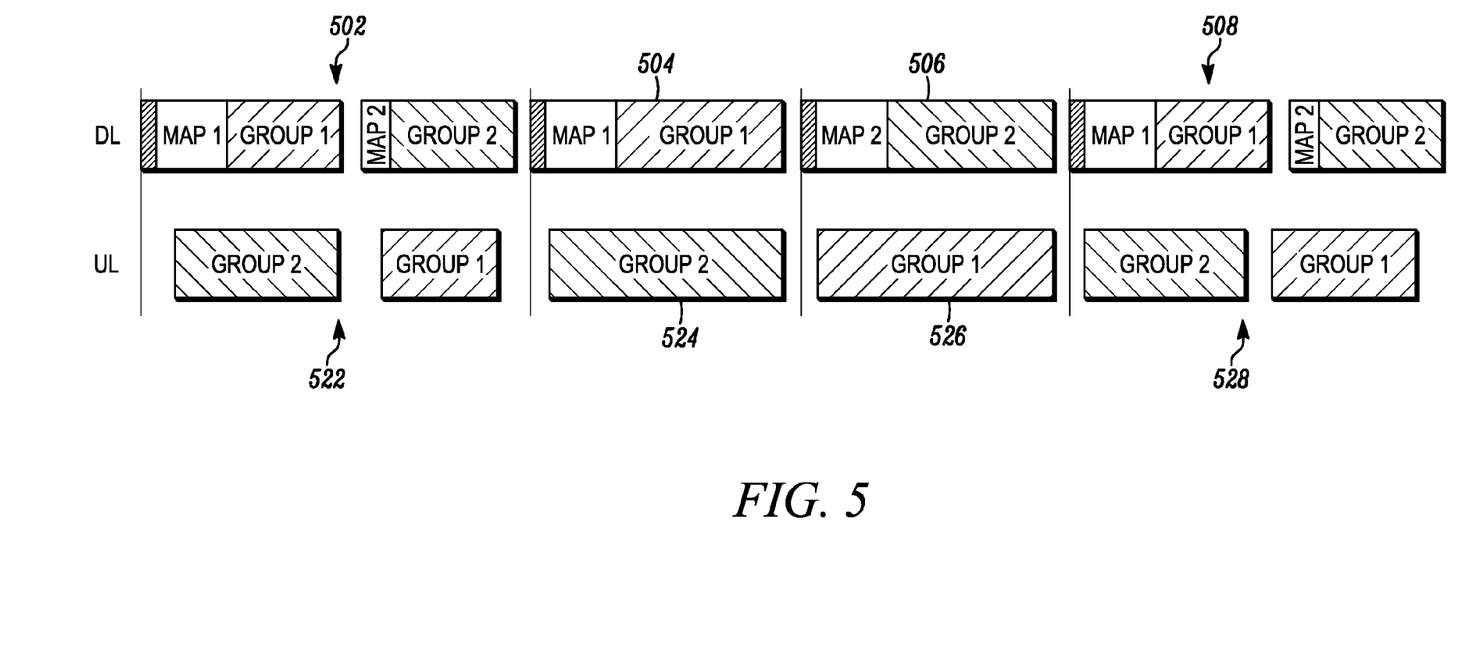
FIG. 5 is another series of downlink and corresponding uplink radio frames serving two groups of half-duplex users where the duration of the first and second regions are dynamically configured to occupy the entire frame in which case only user terminals in the first group are served by the downlink radio frame and only user terminals in the second group are served by a next downlink radio frame, and similarly for uplink radio frames.

In one embodiment, a duration of the first and second temporal regions is changed by configuring the downlink radio frame such that only half-duplex user terminals in the first group are served by the downlink radio frame and only half-duplex user terminals in the second group are served by a next downlink radio frame. A similar configuration may be made to the temporal region of the uplink frames. FIG. 5 illustrates a sequence of DL frames 502, 504, 506, 508 . . . and a corresponding sequence of UL frames 522, 524, 526, 528 . . . . The DL frame 502 and corresponding UL frame 522 both have first and second temporal regions serving user Groups 1 & 2 as indicated. The regions are temporally arranged such that the UL and DL regions serving Group 1 do not temporally overlap and the DL and UL regions serving group 2 do not overlap temporally. The durations of the regions in the DL frame 504 are changed such that DL frame 504 serves only Group 1 user terminals. In this case the second region is eliminated. Similarly, the durations of the regions in the corresponding UL frame 524 are changed such that UL frame 524 serves only Group 2 user terminals. The durations of the regions in the DL frame 506 are changed such that DL frame 506 serves only Group 2 user terminals. In this case the first region is eliminated. Similarly, the durations of the regions in the corresponding UL frame 526 are changed such that UL frame 526 serves only Group 1 user terminals. This configuration of the frame is useful for user terminal that can benefit from longer UL transmission time. For example, cell-edge users that can only use a narrow partial band for transmission due to limited transmission power will need a longer UL region to transmit a packet in one frame without having to segment it.

In one implementation, a base station can use the same configuration message used for region duration change to achieve this particular kind of frame configuration, for example, by specifying the Group 1 duration to the maximal number of OFDM symbols allowed in a frame, and at the same time signaling group 2 starts from the next frame. In the example of using the "Frame Configuration IE", the following fields can be used:

| Field | Value | Size | Notes |
| --- | --- | --- | --- |
| DIUC | 15 | 4 bits | DIUC value |
| Extended DIUC | 0D | 4 bits | Extended DIUC value |
| Length | | 4 bits | Length of the message |
| Symbol offset 1 | 48 | 8 bits | Indicates that group 1 extends till end of frame |
| Symbol offset 2 | 49 | 8 bits | Indicates that group 2 starts from subsequent frame |

In one embodiment, the above frame configuration message indicates the frame structure of FIG. 5 for HD user terminals. In another embodiment, the same frame configuration message may be used to indicate a frame structure of FIG. 4 for FD user terminals. Which of the frame structures is used by a base station may implicitly depend on the user terminal type.

The frame can be reconfigured any time to revert back to the configuration wherein each frame has both the temporal regions, by sending a new "Frame Configuration IE". In FIG. 5, the durations of the regions in the DL frame 508 are changed such that first and second regions serve users in Groups 1 & 2, respectively, and the durations of the regions in the UL frame 528 are changed such that first and second regions serve users in Groups 2 & 1, respectively.

In one implementation, a base station can define each downlink radio frame having first and a second temporal regions with each temporal region in the downlink radio frame serving a group, define each uplink radio frame having first and second non-overlapping temporal regions with each uplink radio frame having a third temporal region that is at least partially overlapping with the first and second temporal regions. Such a frame configuration is useful for users that need longer UL transmission.

Figure 6:
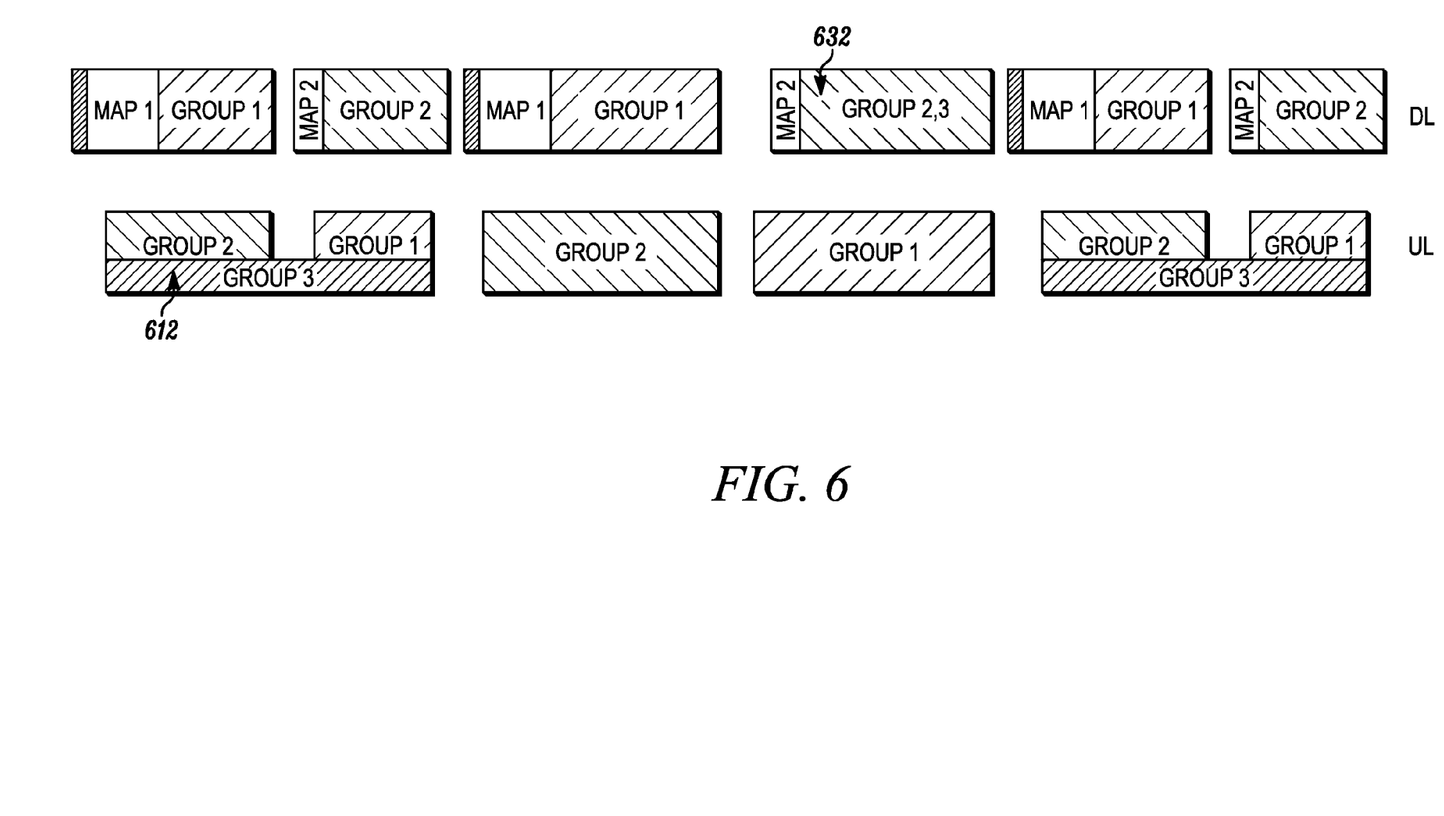
FIG. 6 illustrates a series of downlink and corresponding uplink radio frames configured to serve three groups of half-duplex users with three regions in every other uplink radio frame wherein the third group fully overlaps temporally with the other two groups.

For HD users served by the third temporal region, they are served by downlink radio frames that do not temporally overlap with the third uplink temporal region. In one embodiment, the third temporal region fully overlaps the first and second temporal regions. In this case, HD user terminals of the third group do not receive DL traffic in the downlink frame corresponding to the uplink frame having the third region. Their DL traffic is served in the next frame, either in the first or second downlink. FIG. 6 illustrates this implementation in which the third uplink region occupies a portion of the bandwidth. It is the base station's responsibility to make sure users in Groups 1 and 2 will not overlap with the Group 3 allocation in frequency. Another implementation is for the base station to define Groups 1 and 2 regions that do not overlap in frequency with Group 3 region. In another embodiment, the third temporal region fully overlaps the first temporal regions but partially the second region. In this case, the user terminals in Group 3 may be served in the first region of the corresponding downlink frame, as long as the base station makes sure that the downlink assignment in the first region will not overlap the third uplink region.

In another implementation, the UL duration of the third group temporally overlaps with the UL duration of the first group and the second group in one frame and the DL duration of the third group temporally overlaps with the DL duration of the first group and the second group in the next frame. The DL traffic for a user terminal is scheduled in one frame and the UL traffic for the user is scheduled in the next frame.

Figure 7:
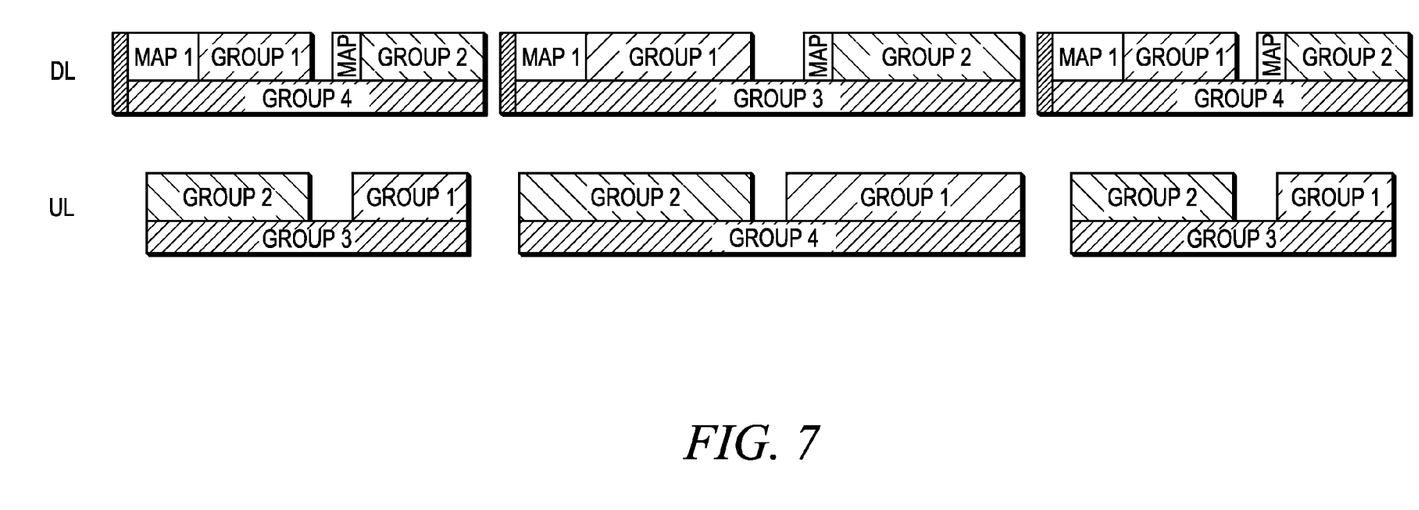
FIG. 7 illustrates a series of downlink and corresponding uplink radio frames configured to serve four groups of half-duplex users with alternating downlink or uplink frame allocated entirely to the third and fourth group.

In another implementation, the user terminals requiring long DL and UL transmissions can be split into a third and fourth groups. In one frame, the UL duration of the third group temporally overlaps with the UL duration of the first group and the second group and the DL duration of the fourth group temporally overlaps with the DL duration of the first group and the second group, and in the next frame, the UL duration of the fourth group temporally overlaps with the UL duration of the first group and the second group and the DL duration of the third group temporally overlaps with the DL duration of the first group and the second group. FIG. 7 illustrates this case.

By allowing a group of user terminals to have a longer UL or DL transmission region, the total MAC PDU size can be increased, thereby reducing the overhead due to CRC. A longer UL region is also useful for the cell-edge VoIP users, who need a longer UL region to transmit the minimum VoIP packet without MAC segmentation.

The frame configuration IE defined above can be modified to signal the presence of a third group and fourth group in the DL radio frame and the UL radio frame. In one implementation, the information element message can be updated as in the following table to accommodate the definition of the added third or fourth group.

| Field | Value | Size | Notes |
|---|---|---|---|
| DIUC | 15 | 4 bits | DIUC value |
| Extended DIUC | 0D | 4 bits | Extended DIUC value |
| Length | | 4 bits | Length of the message |
| Frame type | | 2 bits | 00: Two groups<br>01: Three groups in UL, two groups in DL<br>10: Three groups in both DL and UL<br>11: Four groups in both DL and UL |
| Symbol offset 1 | | 6 bits | Offset of the end of first temporal region from the preamble |
| Symbol offset 2 | | 6 bits | Offset of the start of second temporal region from the preamble |
| If (Frame type==01) { | | | |
| Group 3 start offset | | 6 bits | Offset of start of third group in UL |
| Group 3 end offset | | 6 bits | Offset of end of third group in UL |
| } | | | |
| If (Frame type==10) { | | | |
| Group 3 UL start offset | | 6 bits | Offset of start of third group in UL |
| Group 3 UL end offset | | 6 bits | Offset of end of third group in UL |
| Group 3 DL start offset | | 6 bits | Offset of start of third group in DL |
| Group 3 DL end offset | | 6 bits | Offset of end of third group in DL |
| } | | | |
| If (Frame type==11) { | | | |
| UL start offset | | 6 bits | Offset of start of third and the fourth group in UL |
| UL end offset | | 6 bits | Offset of end of third and the fourth group in UL |
| DL start offset | | 6 bits | Offset of start of third and the fourth group in DL |
| DL end offset | | 6 bits | Offset of end of third and the fourth group in DL |
| } | | | |

In some embodiments, a user terminal may be switched from one group to another. A user terminal can be switched to from one group to another, for example, if the SINR condition of the user changes, or for load balancing, or if the user's traffic pattern changes, etc. For example, when user terminals are grouped based on SINR, a change in the SINR condition may trigger a group switch. The switching of a user from one group to another may be signaled using a number of different mechanisms. Generally, the user terminal is signaled, via MAP message for example, in the temporal region of the DL frame serving the group to which the user is currently assigned. The signal will also generally indicate to which group the user has been assigned. If a user terminal being served in the first temporal region is switched to the second temporal region, and the user terminal has traffic scheduled in the uplink radio frame where the switching is desired, the MAP in the downlink radio frame will indicate the user terminal not to transmit in the first temporal region of subsequent uplink radio frame, but to transmit in the second temporal region of the uplink radio frame after the subsequent uplink radio frame. In the example of IEEE 802.16 standard, this can be achieved by using a reserved bit in the HARQ UL-MAP IE or a reserved bit in the UL-MAP IE to signal the group selection.

To switch a user terminal which does not have any traffic scheduled in the UL, a broadcast message can be defined to signal all users to be switched. In an example of IEEE 802.16, an IE with the following fields may be used:

| Field | Value | Size | Notes |
|---|---|---|---|
| UIUC | 15 | 4 bits | UIUC value |
| Extended UIUC | 0A | 4 bits | Extended UIUC value |
| Length | | 4 bits | Length of the message |
| N_CID | | 4 bits | Number of CIDs that need to be group switched |
| For i=1.. N_CID { CID | CID_value | 16 bits | List of CIDs that need to be switched to the other group |
| } | | | |

Figure 8:
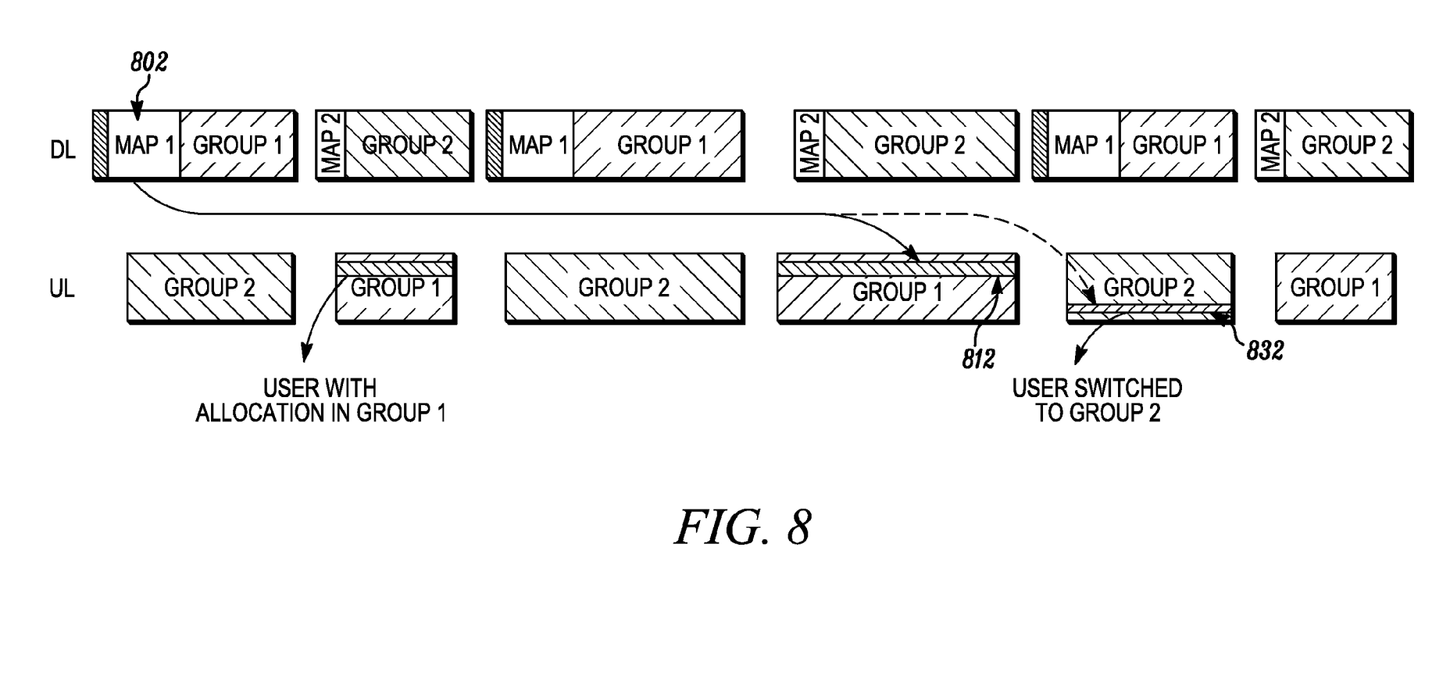
FIG. 8 illustrates the operation of switching a user terminal from one group to another group.

FIG. 8 illustrates the operation of switching a user from Group 1 to Group 2. The MAP message 802 in the temporal region of Group 1 contains a group switch indicator to the user. In FIG. 8, the user terminal has traffic scheduled in the uplink radio frame where the switching is desired, in this example, it is the next frame after MAP. If that user is not instructed to switch, the MAP information is relevant to the allocation 812 in Group 1. With a group switch indication, the user should transmit in the allocation 832, not the allocation 812 any more. The user may start to receive from Group 1, or Group 2, or both, in the frame after the MAP but before the frame having allocation 832, because it does not need to transmit in allocation 812.

The temporal gap in the DL radio frame and the UL radio frame mentioned before is used for switching the user terminal from one mode to another. The total minimum switching gap required (across the DL radio frame and the UL radio frame) is 2*(SSRTG+SSTTG), where SSRTG is the time required by the user terminal to switch from receive mode to transmit mode, and SSTTG is the time required by the user terminal to switch from transmit mode to receive mode.

In the example of IEEE 802.16, the symbol duration for 10 MHz bandwidth is 102.86 us and the frame duration is 5 ms. This numerology allows for a maximum of 48 symbols in a downlink radio frame, with a residual unusable time of approximately 62 us. The temporal gap for switching is provided in the DL radio frame or the uplink radio frame or both. In one implementation, shown in FIG. 9, there is no temporal gap between two downlink frames, and the residual time is assigned between the first temporal region 910 and the second temporal region 920 in the downlink radio frame. This results in the second temporal region of one downlink radio frame immediately followed by the preamble symbol 950 of the subsequent downlink radio frame. This implementation ensures that the residual time is utilized by the user terminals for switching from transmit to receive mode and from receive to transmit mode. If the residual time is assigned between the temporal region 920 of one downlink radio frame and the preamble 950 of the subsequent downlink radio frame, then this gap cannot be used for switching and is wasted.

In a more general formulation, after leaving a minimum switching time of 2*(SSRTG+SSTTG), the residual time that is left is given by $$T_{residual} = 2\left(T_{Frame} - \left\lfloor \frac{T_{Frame} - (SSRTG + SSTTG)}{T_{sym}} \right\rfloor T_{sym}\right) \quad (0.1)$$

where $T_{Frame}$ denotes the frame duration, $T_{sym}$ denotes the OFDMA symbol duration, and $\lfloor a \rfloor$ denotes the flooring operation that yields the maximal integer smaller than a. The residual time is split into four parts, two parts for the downlink radio frame denoted by $T_{DLgap}$ and two parts for the uplink radio frame denoted by $T_{ULgap}$. The exact values of $T_{DLgap}$ and $T_{ULgap}$ depend on whether the DL radio frame includes a part or all of the temporal gap for switching. In one implementation, the DL radio frame and the UL radio frame, both share the temporal gap for switching equally, then $$T_{DLgap} = T_{ULgap} = \frac{T_{residual}}{4} \quad (0.2)$$

Figure 9:
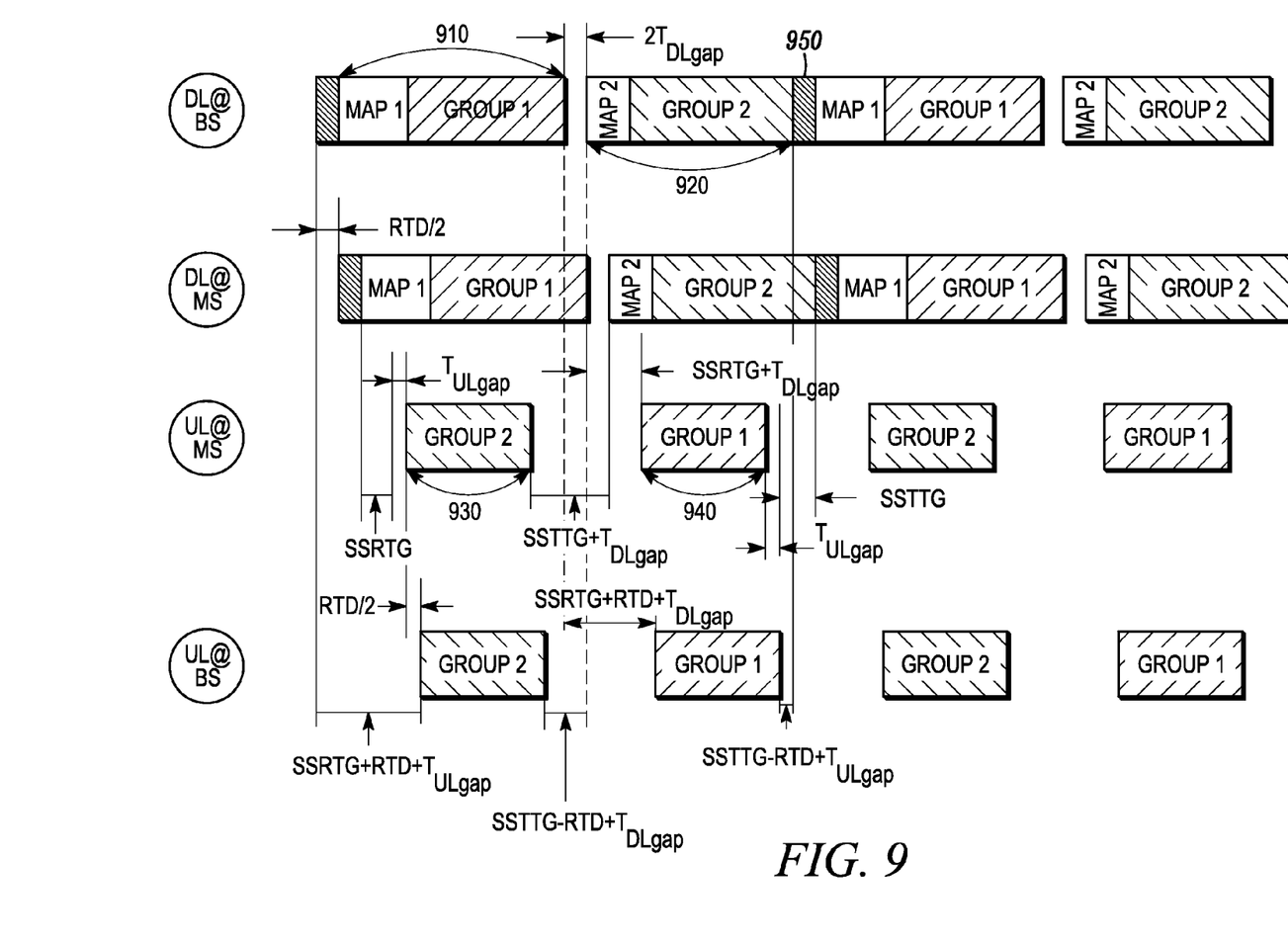
FIG. 9 illustrates the method of best utilizing the temporal gap in the downlink and uplink radio frame to maximize the time available of the user terminal to switch from receive to transmit mode and transmit to receive mode.

In the downlink radio frame, $T_{DLgap}$ is located between the first temporal region 910 and the second temporal region 920. In the uplink radio frame, $T_{ULgap}$ is located before the second temporal region 930 and after the first temporal region 940.

When the residual time in the downlink is equal to the residual time in the uplink, i.e., $T_{DLgap}=T_{ULgap}$, the gap between the DL region for one group and its corresponding UL region at a base station (referred to as RTG) and the gap between the UL region for one group and its corresponding DL region (referred to as TTG) will be $$RTG=SSRTG+RTD+T_{gap} \quad (0.3)$$

$$TTG=SSTTG-RTD+T_{gap}$$

where $T_{gap}=T_{DLgap}=T_{ULgap}$ and RTD (Round-Trip Delay) is the round trip propagation time between the user location and the base station. By placing the residual time in a manner mentioned above, the effective RTG and TTG can be increased. This relaxes the constraints on the switching time available for the user terminal, or increases the maximum allowable RTD, or both.

To define the frame structure, the relative positions of the first and second temporal regions in the DL radio frame and the UL radio frame need to be defined. The above definition of RTG and TTG implies that the frame structure depends on the selected values of SSRTG, SSTTG, RTD and the derived value of $T_{gap}$.

In another implementation, the DL radio frame and the UL radio frame, do not share the temporal gap for switching equally. The DL radio frame has a temporal gap for switching that equals SSRTG, while the UL radio frame has temporal gap for switching that equals SSRTG+2*SSTTG. $T_{ULgap}$ and $T_{DLgap}$ are then defined as $$T_{DLgap} = \frac{1}{2}\left(T_{Frame} - \left\lfloor \frac{T_{Frame} - SSRTG}{T_{sym}} \right\rfloor T_{sym}\right) \quad (0.4)$$

$$T_{ULgap} = \frac{1}{2}\left(T_{Frame} - \left\lfloor \frac{T_{Frame} - (SSRTG + 2*SSTTG)}{T_{sym}} \right\rfloor T_{sym}\right)$$

In one implementation, the RTG and TTG values for the first group (denoted by RTG1 and TTG1) is different from the RTG and TTG value for the second group (RTG2 and TTG2):

$$RTG1=SSRTG+RTD+T_{DLgap}$$

$$RTG2=SSRTG+RTD+T_{ULgap}$$

$$TTG1=SSTTG-RTD+T_{ULgap}$$

$$TTG2=SSTTG-RTD+T_{DLgap} \quad (0.5)$$

In another implementation, the RTG and TTG values for the two groups can be made same:

$$RTG1=SSRTG+RTD+(T_{DLgap}+T_{ULgap})/2$$

$$RTG2=SSRTG+RTD+(T_{DLgap}+T_{ULgap})/2$$

$$TTG1=SSTTG-RTD+(T_{DLgap}+T_{ULgap})/2$$

$$TTG2=SSTTG-RTD+(T_{DLgap}+T_{ULgap})/2 \quad (0.6)$$

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a particular user terminal served by a wireless communication base station that serves half-duplex frequency division duplex user terminals, the method comprising:
    operating the particular user terminal in half-duplex frequency division duplex mode;
    receiving, at the particular user terminal, a downlink radio frame that is part of a series of downlink radio frames, each downlink radio frame in the series of radio frames having a first temporal region and a second temporal region, user terminals in a first group receiving only in the first temporal region of the downlink radio frame and user terminals in a second group receiving only in the second temporal region of the downlink radio frame, the particular user terminal switching from receiving only in the first temporal region to receiving only in the second temporal region; and
    receiving, at the particular user terminal before switching, signaling in the first temporal region of the downlink radio frame, the signaling indicating that the particular user terminal will be receiving only in the second temporal region of a later downlink radio frame.

2. A method in a user terminal served by a wireless communication base station, the method comprising:
    receiving, at the user terminal, a plurality of downlink radio frames wherein each downlink radio frame includes a first temporal region and a second temporal region, the user terminal receiving in the first temporal region of a first downlink radio frame wherein the user terminal cannot receive in the second temporal region of the first downlink radio frame when receiving in the first temporal region of the first downlink radio frame;
    receiving, at the user terminal, a switch indication in the first temporal region of the first downlink radio frame, the switch indication signaling the user terminal to receive only in the second temporal region of a second downlink radio frame, the second downlink radio frame occurring later in time relative to the first downlink radio frame, the user terminal switching from receiving only in the first temporal region of the first downlink radio frame to receiving only in the second temporal region of the second downlink radio frame in response to the switch indication; and
    transmitting, at the user terminal, from a plurality of uplink radio frames wherein each uplink radio frame includes two uplink temporal regions corresponding to the first and second temporal regions of each downlink radio frame, the user terminal transmitting only in the uplink temporal region corresponding to the second temporal region of the first downlink radio frame, the user terminal switching from transmitting only in the uplink temporal region corresponding to the second temporal region of the first downlink radio frame to transmitting only in the uplink temporal region corresponding to the first temporal region of the second downlink radio frame in response to the switch indication.

3. The method of claim 2, wherein each of the first and second temporal regions of each downlink radio frame contain a corresponding control message in which a switch indication may be communicated to a user terminal.

4. The method of claim 2, wherein the switch indication signals which temporal region the user terminal should receive starting from the second downlink radio frame.

* * * * *